Patented Jan. 28, 1936

2,028,761

UNITED STATES PATENT OFFICE 2,028,761

METHOD OF TREATING CELLULOSE ESTERS OF ORGANIC ACIDS

Camille Dreyfus, New York, N. Y., and George Schneider, Montclair, N. J., assignors to Celanese Corporation of America, a corporation of Delaware No Drawing. Application June 28, 1930, Serial No. 464,703

4 Claims. (Cl. 260—102)

This invention relates to the preparation of organic esters of cellulose and relates more particularly to the purification of such cellulose esters that have been prepared while in suspension in the esterifying mixture.

An object of our invention is to prepare organic esters of cellulose that have been formed while in suspension in the esterifying mixture and which are more free from sulfur compounds than former cellulose esters made by this method.

A further object of our invention is to treat cellulose acetate or other organic ester of cellulose that have been prepared in suspension by subjecting the same to the action of an aqueous liquid that is maintained at elevated pressure and preferably at a temperature above the normal boiling point of water and corresponding to the temperature at which water has a vapor tension equal to such elevated pressure. Further objects of our invention will appear from the following detailed description.

It has been formerly proposed to acetylate cellulose in the presence of sulfuric acid or other sulfur-bearing catalysts by means of an acetylation mixture containing a sufficient quantity of benzol or other non-solvent for the cellulose acetate to act as a diluent so that the resulting cellulose acetate does not dissolve in the acetylation mixture but remains suspended therein. Such cellulose acetate can be separated by mechanical means from the acetylation mixture. However cellulose acetate formed by this method contains a very large amount of sulfur compounds, which render the same quite unstable. These sulfur compounds are very difficult if not impossible to remove to the required extent by the means formerly employed for this purpose. If the cellulose acetate is subjected to sufficient hydrolysis by known methods to reduce the sulfur content within permissible limits, the cellulose acetate becomes so hydrolyzed that it is no longer soluble in the organic solvents that are commercially available.

Because of such difficulties, the suspension method of acetylation is not employed in commercial practice, but resort is had to acetylation of cellulose in an acetylating bath that contains sufficient proportions of acetic acid or other solvents for the cellulose acetate, so that the cellulose acetate that is formed enters into solution to form a syrupy mass or dope. The cellulose acetate, after any desired treatments, is then precipitated by the addition of water which forms a relatively dilute acetic acid. This dilute acetic acid, after separation of the cellulose acetate, must be subjected to an elaborate process to recover the acetic acid in concentrated form for reuse, and the cellulose acetate must be subjected to prolonged washing and stabilizing treatments. Although the suspension method of acetylation is much simpler and more economical than the solution method, it has been heretofore found necessary to employ the solution method in commercial practice because of the above mentioned difficulty of obtaining a stable product of proper solubility characteristics by the suspension method.

We have now found that if cellulose acetate or other organic esters of cellulose that has been formed by the suspension method in the presence of a sulfur-bearing catalyst is subjected to boiling water or other aqueous liquid at super-atmospheric pressure and at a temperature above the normal boiling point of water (100° C.), for a suitable period of time, appreciable amounts and even all of the sulfur is removed therefrom, while the cellulose acetate or other organic ester of cellulose still has the required solubility in commercially available organic solvents. This result is surprising and renders available the use of the relatively simple suspension method of acetylation for commercial purposes.

In accordance with our invention, we purify organic esters of cellulose which have been formed while in suspension in the esterifying bath by subjecting the same to the action of water or aqueous liquid at temperatures above the normal boiling point of water (100° C.) and at super-atmospheric pressure for a suitable period of time.

While this invention will be described in connection with the treatment of cellulose acetate it is equally applicable to other organic esters of cellulose such as cellulose formate, cellulose propionate and cellulose butyrate. To prepare the cellulose acetate cellulose of any suitable kind such as cotton, cotton linters, purified wood pulp and the like is subjected to acetylation. The cellulose may be pretreated with acetic acid, formic acid or other lower fatty acids either in liquid or vapor form or it may be pretreated with a mixture of such acids and sulfuric acid or other catalyst to be employed in the esterification or with a mixture of acetic acid and acetic anhydride containing no catalyst. Any other form of pretreatment of the cellulose may be employed or the cellulose may be acetylated without any pretreatment whatsoever.

To form the cellulose acetate by the suspension method, the cellulose, pretreated or not, is subjected to the action of an acetylation bath containing an appropriate amount of acetic anhydride, a catalyst, and a diluent. The acetylation bath preferably contains some acetic acid but the quantity thereof is not sufficient to form with the diluent present a solvent mixture for the cellulose acetate that is formed. The cellulose acetate thus formed has the original form of the cellulose fibers from which it is made.

The greatest advantages result when the acetylation catalyst employed is sulfuric acid or other sulfur-bearing catalyst such as sulfur chloride, the bi-sulfates of sodium, potassium or methylamine, or other bi-sulfates, chlor sulphonic acid, dimethyl sulfate, etc. However the treatment of cellulose acetate prepared in the presence of other catalysts such as zinc chloride is not excluded.

As non-solvent diluent in the acetylation mixture to prevent the solutioning of the cellulose acetate that is formed, we prefer benzol. However other diluents such as toluol, ethyl ether, isopropyl ether, carbon tetrachloride, a mixture of benzol and petroleum ether and the like may be employed.

The cellulose acetate, in accordance with our invention, is treated with water or aqueous liquid preferably at temperatures above 100° C. In order to attain these temperatures, pressure is caused to develop by heating a closed vessel in which the treatment is taking place, and the temperature will depend upon such pressure, as is well understood. Heating may also be performed by injection of steam under high pressure. Generally super-atmospheric pressures of 15 to 200 lbs. per square inch or more will be employed, and the temperatures are those at which water develops such vapor pressures. The amount of water used is generally from 4 to 50 or more times the weight of the cellulose acetate being treated and the time of treatment may vary from a few minutes to 10 hours or more.

Definite figures cannot be given, since there is an interrelationship between the pressures and temperatures employed, the amount of water used and the time of treatment. The greater the amount of pressure and temperature used, the less time is required and at the high pressures only a relatively short time is necessary. Likewise for larger amounts of water less pressure and less time is required. We have found that the use of distilled water produces excellent results, and therefore we prefer to employ relatively soft water or distilled water.

We have found that at the higher pressures and temperatures of treatment, the viscosity characteristics may be reduced to any desired extent by controlling the time of treatment. Prolonged treatment at lower pressures and temperatures will also reduce the viscosity characteristics. On the other hand such temperatures, pressures and time of treatment may be chosen whereby little or no reduction in the viscosity characteristics takes place.

By employing lower pressures and temperatures and shorter time of treatment, the solubility characteristics of the cellulose acetate may be affected little or not at all. On the other hand by prolonging the treatment or by using higher temperatures and pressures the solubility characteristics of the product may be changed as desired. Often the cellulose acetate formed is not fully soluble in acetone and by the digestion with water, at suitable temperatures and pressures for a suitable length of time full solubility in acetone may be developed. In some cases, the cellulose acetate may be completely soluble in acetone, in which event suitable temperatures and pressure and time of treatment are chosen that do not affect the solubility of the cellulose acetate.

During the treatment with water at the elevated temperatures and pressures, sulfuric acid develops. When the original cellulose acetate contains a relatively high proportion of sulfur compounds, this sulfuric acid may cause hydrolysis to a greater extent than is desired. In this case the water of treatment may be changed either intermittently or continuously or such water may be either intermittently or continuously withdrawn and the acid neutralized with alkali.

It is advantageous to give the cellulose acetate a final washing with hard water.

By the method of this invention, cellulose acetate having a sulfur compound content corresponding to as high as 5% determined as sulfate ($SO_4$) can be reduced to as low as 0.15% down to 0.01% or even to no sulfur compound content, depending upon the time, temperature and pressure of treatment. A cellulose acetate having an original charring point of 150° C. can be treated by this invention, and a charring point of 200 to 260° C. or more has been imparted thereto. The term "charring point" means the temperature at which the material assumes a dark color or chars.

Any suitable form of apparatus may be employed for carrying out this invention. Thus if a batch process is to be employed, the cellulose acetate and water may be placed in an autoclave which is heated until the desired pressure develops. For a continuous process, the mixture of the water and cellulose acetate may be passed continuously through an autoclave or heated passages, such as pipes, coils and the like that are maintained at the required pressure and until the required temperature is attained. This pressure may be maintained by a pressure release valve at the exit of the passageway, or the pipes or coils may be connected with stand pipes of sufficient height so as to develop a hydrostatic pressure corresponding to that required. The length of the passage and the rate of flow is regulated so that the cellulose acetate is subjected to the treatment for the required period of time.

By this method it is possible to obtain a variety of cellulose acetates some of which have high acetyl values (even as high as above 57% determined as acetic acid), which may be soluble in acetic acid, chloroform, a mixture of chloroform and alcohol, acetone, and even in mixtures of acetone and alcohol and mixtures of acetone and water, and which cellulose acetate contains little or no sulfur compounds and is stable at high temperatures—a result heretofore impossible of attainment.

The cellulose acetate prepared by this invention is extremely valuable for making yarns or fabrics, varnishes, lacquers, films, celluloid-like articles, coatings, etc.

In order further to illustrate our invention, but without being limited thereto, the following examples are given.

Example I 100 parts by weight of cotton linters are pretreated with 20 parts of glacial acetic acid for 3 to 12 hours at room temperatures. The resulting product is then further pretreated with a mixture of 125 to 250 parts of glacial acetic acid, 500 to 750 parts of benzol and less than 5 to 25 or more parts of sulfuric acid for 1 to 12 hours at 15 to 50° C. Thereafter 250 to 375 parts of acetic anhydride are added whereupon acetylation takes place. During acetylation, the temperature is maintained at 20 to 30° C. and because of the presence of the benzol the cellulose acetate does not enter into solution. Acetylation is allowed to proceed until a sample of the cellulose acetate, which remains in suspension, when tested forms a clear solution in acetic acid, chloroform or acetone, or in any other desired solvent.

After completion of acetylation, the cellulose acetate is removed from the acetylated mixture by filtration or in a centrifugal basket and the excess acetic acid is removed therefrom by washing with benzol. The solution of benzol and acetic acid resulting from the acetylation and washing may be worked up in any desired manner for re-use in acetylation of further quantities of cellulose.

The cellulose acetate is now washed with water until neutral. It is soluble in chloroform, a mixture of chloroform and alcohol, and either completely or relatively soluble in acetone. It has a sulfur compound content corresponding from 1 to 6% of $SO_4$ and has a charring point of only 140 to 160° C.

The cellulose acetate is now placed in an autoclave where it is heated with 15 times its weight of water until a pressure of 20 lbs. per square inch above atmospheric develops. After ½ hour of treatment, the sulfur compound content is reduced to 0.10% $SO_4$ and has a heat test of 200 to 210° C. and its solubility in acetone is improved.

The cellulose acetate is now washed with water and heated with 15 times its weight of fresh water in an autoclave at 20 lbs. pressure above atmospheric for one hour. The sulfur compound content is reduced to 0.02% $SO_4$, the charring point is 235 to 250° C., while the cellulose acetate is still highly soluble in chloroform and a mixture of chloroform and alcohol and in other solvents.

If desired, the cellulose acetate may then be washed with hard water to further improve its heat test.

*Example II*

100 parts by weight of cotton linters, without previous pretreatment, are subjected to a mixture of 250 parts of acetic anhydride, 200 parts of acetic acid, 10 parts of sulphuric acid and 600 parts of benzol at a temperature of 25 to 30° C. Acetylation is allowed to proceed until a sample of the cellulose acetate, which remains in suspension, is soluble in acetic acid and completely soluble in acetone. After completion of the acetylation the cellulose acetate is separated and washed as in Example I and is then heated with water in a closed vessel until a pressure of 20 lbs. per square inch develops for 2 hours continuously. The cellulose acetate after the treatment contains no sulphur compounds and has the same solubility characteristics as the cellulose acetate before it was subjected to treatment of water at the elevated temperatures and pressures.

It is to be understood that the foregoing detailed description is given merely by way of illustration and that many variations may be made therein without departing from the spirit of this invention.

Having described our invention what we claim and desire to secure by Letters Patent is:

1. Method of preparing a cellulose ester of an organic acid containing little or no sulfur compounds and of improved solubility in acetone, which comprises treating a cellulose ester of an organic acid formed by a suspension method in the presence of a sulfur-containing catalyst with an aqueous liquid at super-atmospheric pressures and at temperatures above 100° C., and then further treating the same with fresh aqueous liquid at super-atmospheric pressures and temperatures above 100° C. until substantially all of the sulfur compounds are removed and the solubility of the cellulose ester in acetone is improved.

2. Method of preparing a cellulose ester of an organic acid containing little or no sulfur compounds and of improved solubility in acetone, which comprises treating a cellulose ester of an organic acid formed by a suspension method in the presence of sulfuric acid as a catalyst with an aqueous liquid at super-atmospheric pressures and at temperatures above 100° C. and continuously replacing at least part of the aqueous liquid with fresh aqueous liquid during the treatment until substantially all of the sulfur compounds are removed and the solubility of the cellulose ester in acetone is improved.

3. Method of preparing a cellulose acetate containing little or no sulfur compounds and of improved solubility in acetone which comprises treating cellulose acetate formed by a suspension method in the presence of a sulfur-containing catalyst with an aqueous liquid at super-atmospheric pressures and at temperatures above 100° C., and then further treating the same with fresh aqueous liquid at superatmospheric pressures and temperatures above 100° C. until substantially all of the sulfur compounds are removed and the solubility of the cellulose acetate in acetone is improved.

4. Method of preparing a cellulose acetate containing little or no sulfur compounds and of improved solubility in acetone which comprises treating cellulose acetate formed by a suspension method in the presence of sulfuric acid as a catalyst with an aqueous liquid at super-atmospheric pressures and at temperatures above 100° C. and continuously replacing at least part of the aqueous liquid with fresh aqueous liquid during the treatment until substantially all of the sulfur compounds are removed and the solubility of the cellulose acetate in acetone is improved.

CAMILLE DREYFUS.
GEORGE SCHNEIDER.